United States Patent
Brunswig et al.

(10) Patent No.: US 8,645,913 B2
(45) Date of Patent: Feb. 4, 2014

(54) WEB-SERVICE BASED GENERATION OF BUSINESS OBJECTS

(75) Inventors: Frank Brunswig, Heidelberg (DE);
Frank Jentsch, Muehlhausen (DE);
Baré Said, Sankt Leon-Rot (DE)

(73) Assignee: SAP AG, Walldorf (DE)

( * ) Notice: Subject to any disclaimer, the term of this patent is extended or adjusted under 35 U.S.C. 154(b) by 442 days.

(21) Appl. No.: 12/974,676

(22) Filed: Dec. 21, 2010

(65) Prior Publication Data
US 2012/0158416 A1 Jun. 21, 2012

(51) Int. Cl.
*G06F 9/44* (2006.01)

(52) U.S. Cl.
USPC ............ 717/106; 717/108; 717/114; 717/116

(58) Field of Classification Search
None
See application file for complete search history.

(56) References Cited

U.S. PATENT DOCUMENTS

| | | | |
|---|---|---|---|
| 7,421,699 B2 * | 9/2008 | Brendle et al. | 719/310 |
| 7,480,920 B2 * | 1/2009 | Brendle et al. | 719/320 |
| 7,698,398 B1 * | 4/2010 | Lai | 709/223 |
| 7,814,458 B2 * | 10/2010 | Kalia et al. | 717/104 |
| 2006/0074732 A1 * | 4/2006 | Shukla et al. | 705/8 |
| 2006/0074736 A1 * | 4/2006 | Shukla et al. | 705/8 |
| 2006/0129974 A1 * | 6/2006 | Brendle et al. | 717/108 |
| 2006/0225032 A1 * | 10/2006 | Klerk et al. | 717/105 |
| 2007/0157096 A1 * | 7/2007 | Keren et al. | 715/760 |
| 2007/0226751 A1 * | 9/2007 | Brendle et al. | 719/313 |
| 2007/0268822 A1 * | 11/2007 | Brunswig et al. | 370/229 |
| 2008/0082959 A1 * | 4/2008 | Fowler | 717/104 |
| 2008/0147455 A1 * | 6/2008 | Brunswig et al. | 705/7 |
| 2009/0254906 A1 * | 10/2009 | Zhang et al. | 718/101 |

OTHER PUBLICATIONS

Title: Developing XML Web services with WebSphere Studio Application Developer, author: C Lau et al, source: IEEE, dated: 2002.*
"Fuse Services Framework", FuseSource, Tool Reference, V. 2.2.x, Apr. 2009, 58 pages.
Keller, et al, "ABAP Objects", ABAP Programming in Sap NetWeaver, Chapter 6, Mar. 15, 2007, 120 pages.
McNulty, et al, "ABAP Objects—Basics", SAP, Guided Tutorial, 2009, 44 pages.
Seubert, et al, "Enterprise SOA Object & Service Operation Design", Part 11 of VI, Business Object Modeling Guideline, Version 2.7, Feb. 27, 2009, 237 pages.

* cited by examiner

*Primary Examiner* — Chameli Das
(74) *Attorney, Agent, or Firm* — Brake Hughes Bellermann LLP (57) ABSTRACT

A business object is generated based on a discovered web service having an associated Web Service Description Language (WSDL) file. The business object includes at least one data type and the at least one interface operation of the WSDL file. The business object is configured to expose web service functionality of the web service in an integrated manner within a business object based application environment. Generating the business object includes converting the at least one data type to a format consistent with the business object based application environment, creating at least one business object node of the business object that corresponds to each interface operation of the WSDL file, the at least one business object node being based on the at least one message, and creating a node action for the at least one business object node, the node action corresponding to the at least one interface operation.

18 Claims, 8 Drawing Sheets

```
<definitions>
<wsdl:definitions targetNamespace="http://sap.com/xi/AP/FO/AddressinfoExample/Global"
    <types>
<xsd:complexType name="AdressInfo">                           402
    <xsd:all>
        <xsd:element name="Adress Description" type="xsd:string" minOccurs="0"/>

<xsd:element name="PhoneNumber"type="typens:PhoneNumberArray"minoccurs="0"/>
</xsd:all>
</xsd:complexType>
                                                              404

<xsd:complexType name=PhoneNumbersArray">
                                                  406
    <xsd:complexContent>
        <xsd:restriction base="soapenc:array">
    <xsd:attribute ref="soapenc:arrayType" wsdl:arrayType="typens:Phonenumbers[]"/>
    </xsd:complexContent>
</xsd:complexType>
    <xsd:complexType name="PhoneNumbers">
        <xsd:all>
    <xsd:element name="ID"type="xsd:string"minOccurs="0"/>      408

<xsd:element name="Number"type="xsd:string" minOccurs="0"/>
    </xsd:complexType>
</types>
  <messages>
    <message name="GetAdressInfoRequest">         410
    <part name="CustomerID"Type="xsd:string"/>
    </message>                                              412
    <message name="GetAdressInfoResponse">
      <part name="GetAdressInfoResponse"type="typens:AdressInfo"/>
      </message>
    <options>
    <operation name="GetCustomerAdressInfo">
    <output message="typens:GetAdressInfoResponse"/>    414
  </operation>
</definitions>
```

WEB-SERVICE BASED GENERATION OF BUSINESS OBJECTS

TECHNICAL FIELD

This description relates to object-based application and development environments.

BACKGROUND

Software application and development environments based on business objects are known to provide for ease of development and use of related software applications. Specifically, for example, business objects may be used to encapsulate defined attributes, values, and associated data, as well as related logic and/or associated behaviors. Thus, a business object may correspond to, or represent, a specific technical, semantic, and/or tangible entity which is known to have certain properties and capabilities, and may interact with other business objects representing corresponding entities, to thereby collectively provide a desired functionality. Due to their modular properties and other known aspects, business objects may enable fast, convenient development of highly customized software applications, which are therefore straightforward for a developer to implement, and likely to fulfill the needs and requirements of consumers or other users thereof.

Meanwhile, web services generally refer to software applications which are available over a computer network, e.g., the public internet, and which are exposed for interaction with other applications (e.g., other web services), using one or more known and defined techniques and associated protocols for conducting such interactions. Web services thus represent a large number, and wide variety, of network-available software applications, many or most of which are associated with a particular provider or other context (e.g., associated with a particular website).

Generally speaking, business object based environments may not be compatible with, e.g., may not interact directly with, available web services. It is possible to manually construct software elements which enable compatibility/communication between a given web service and a particular business object, or to otherwise manually enable the use of some or all functionality of a particular web service within a business object based environment. However, efforts required in this regard may be time-consuming and resource-intensive. As a result, it may be difficult for developers and other users of a business object based environment to make use of available web services.

SUMMARY

According to one general aspect, a system may include instructions recorded on a computer-readable medium and executable by at least one processor of one or more computing devices. The system may include a Web Service Description Language (WSDL) inspector configured to cause the at least one processor to determine a WSDL file describing a web service that provides web service functionality, and further configured to determine at least one data type included in the WSDL file and to extract at least one interface operation from the WSDL file, the at least one interface operation including at least one message sent during implementation of the at least one interface operation, the at least one message using the at least one data type. The system may further include a business object generator configured to cause the at least one processor to generate a business object based on the at least one data type and the at least one interface operation, wherein the business object corresponds to a business entity and exposes the web service functionality in an integrated manner within a business object based application environment. The generating of the business object may include creating at least one business object node of the business object that corresponds to each interface operation of the WSDL file, the at least one business object node being based on the at least one message, and creating a node action for the at least one business object node, the node action corresponding to the at least one interface operation.

According to another general aspect, a Web Service Description Language (WSDL) file describing a web service that provides web service functionality may be determined, including determining at least one data type included in the WSDL file. At least one interface operation may be extracted from the WSDL file, the at least one interface operation including at least one message sent during implementation of the at least one interface operation, the at least one message using the at least one data type. A business object may be generated based on the at least one data type and the at least one interface operation, wherein the business object corresponds to a business entity and exposes the web service functionality in an integrated manner within a business object based application environment. The generation of the business object may include creating at least one business object node of the business object that corresponds to each interface operation of the WSDL file, the at least one business object node being based on the at least one message, and creating a node action for the at least one business object node, the node action corresponding to the at least one interface operation.

According to another general aspect, a computer program product that is tangibly embodied on a computer-readable medium may comprise instructions that, when executed, are configured to determine a Web Service Description Language (WSDL) file describing a web service that provides web service functionality, determine at least one data type included in the WSDL file, extract at least one interface operation from the WSDL file, the at least one interface operation including at least one message sent during implementation of the at least one interface operation, the at least one message using the at least one data type, and generate a business object based on the at least one data type and the at least one interface operation, wherein the business object corresponds to a business entity and exposes the web service functionality in an integrated manner within a business object based application environment. The generating may include creating at least one business object node of the business object that corresponds to each interface operation of the WSDL file, the at least one business object node being based on the at least one message, and creating a node action for the at least one business object node, the node action corresponding to the at least one interface operation.

The details of one or more implementations are set forth in the accompanying drawings and the description below. Other features will be apparent from the description and drawings, and from the claims.

BRIEF DESCRIPTION OF THE DRAWINGS

FIG. 4 is an XML document providing an example of a WSDL document.

DETAILED DESCRIPTION

Figure 1:
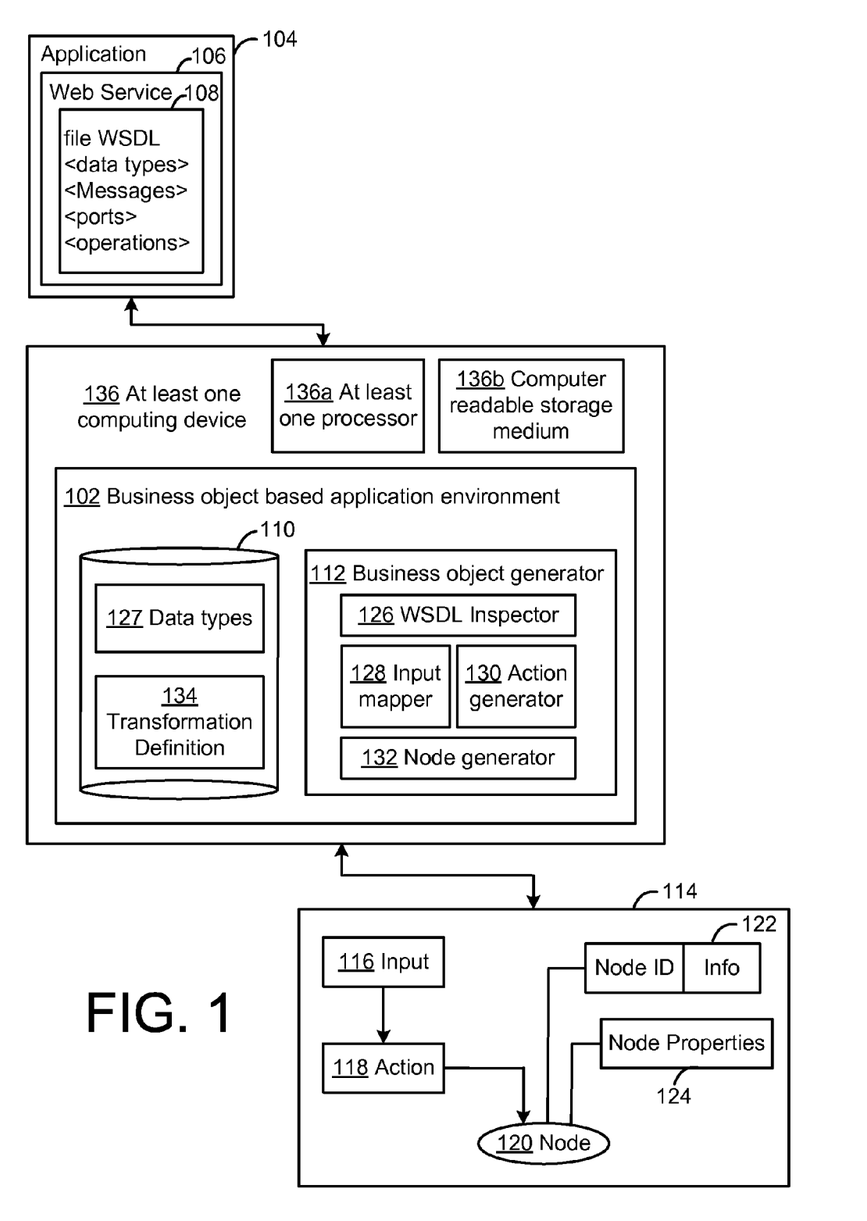
FIG. 1 is a block diagram of a system for automatically generating a business object based on a web service.

FIG. 1 is a block diagram of a system 100 for automatically generating a business object using a web service. By way of such automatic generation of business objects, a software developer may be facilitated in quickly developing software applications which are capable of utilizing available network resources, including specific web services. As a result, consumers and other users of such developed software applications are more likely to obtain software applications which fulfill their needs, and to receive such software applications in a reduced timeframe.

In the example of FIG. 1, business object based application environment 102 is illustrated which may be configured to provide such automated generation functionality. As referenced above, environments which utilize business objects in the development and implementation of software applications are, by themselves, generally well known. Consequently, many functions and features of such business object based environments are not described here in detail, except as may be necessary or helpful in understanding operations of the system 100 of FIG. 1. Rather, as described in detail below, the business object based application environment 102 of FIG. 1 is illustrated as including various new components, and/or known components having new functions and features, which are relevant or helpful in understanding the automated generation of business objects based on existing web services.

In the various examples provided herein, the term "business object" may be understood to represent, as referenced above, virtually any software object which seeks to encapsulate data and associated methods, and which represent an entity within a modular software development environment. As is known, such software objects may be known by many different nomenclatures and terminologies, and may include, for example, enterprise java beans (EJBs), ABAP objects, business objects and variations thereof.

Further, in the described examples, references are made primarily to business objects in corporate or enterprise settings. However, it will be appreciated that the term business should be understood to represent virtually any profit related activities associated with a legal entity, as well as various not-for-profit entities, such as, e.g., schools, governmental entities, charitable entities, the military, or any other entity which may benefit from the modular software development techniques described herein.

With reference to the specific examples given in traditional corporate or enterprise context, it may be appreciated that various business objects used within the business object based application environment 102 may represent defined entities which exist in such environments. For example, within a specific enterprise, a business object may exist which relates to an entity such as, e.g., a customer, a sales order, a delivery, an employee, a physical resource such as a building or piece of equipment, or any other semantic, technical, and/or tangible entity which may exist in, or be utilized by, the enterprise in question. Such entities and associated business objects are well known to one of skill in the art, and therefore are not described here in further detail except as may be necessary or helpful in understanding example operations of the system 100 of FIG. 1.

As also referenced above, and as is also well known, the business object based application environment 102 may be associated with a number of developmental entities and associated development tools (not specifically illustrated in the example of FIG. 1) which are designed to allow developers to quickly and easily generate desired functionalities and results, using existing business objects. For example, developmental tools may include tools for generating a graphical user interface based on one or more business objects, and/or may include report generation tools which enable business objects to generate reports and other analyses of data included in, or associated with, one or more business objects. In general, such developmental tools, as well as other features and functions of the business object based application environment 102, illustrate many of the advantages described herein, e.g., the nature and extent of interoperability between business objects, as well as the ease and flexibility of use of the business objects in obtaining a desired result.

As also illustrated in the example of FIG. 1, one or more external applications, represented in the example of FIG. 1 by the application 104, may execute on remote servers which are in communication with the business object based application environment via an appropriate computer network, e.g., the public internet. As referenced above, such applications may generally provide various features and functionalities which may be useful or advantageous to a developer utilizing the business object based application environment 102. Often, the application 104 may expose some or all of its features and functionalities using a web service 106, which, as described above and as is well known, utilizes a number of known formats, techniques, and associated protocols for exposing the features and functionalities of the application 104 in a discoverable manner. Further, the web service 106 is exposed in a manner which provides for ease of interaction between the web service 106 and other web services, or other application interfaces which are designed to be interoperable with the web service 106.

In particular, as illustrated in the example of FIG. 1, the web service 106 may be associated with, or may include, a web service description language (WSDL) file 108 which specifies information which allows other web services and other compatible application interfaces to take advantage of the features and functionalities associated by the web service 106. In general, the WSDL file 108 thus represents a document which adheres to a number of agreed-upon formats, semantics, syntax, and/or other conventions, so that providers and consumers of web services may follow such conventions when designing and utilizing a web service to interact with existing web services.

For example, in the example of FIG. 1 and in the examples that follow, the WSDL file 108 is illustrated and described as an eXtensible Markup Language (XML) document, which includes a number of known components or elements. For example, as shown, the WSDL file 108 may include data types and associated definitions which instruct a consumer of the web service 106 with respect to a manner in which data shared by the web service 106 is represented, formatted, or otherwise provided. For example, a number of simple data types exist which represent numbers, dates, or other basic units or elements of information according to one of a plurality of known possibilities.

Further, complex data types may be defined which build on, or are based on, underlying simple data types, but which represent more detailed descriptions of specific types of data elements and relationships there between. Often, such data types may be at least partially expressed and described within one of a number of existing contexts. For example, a number of XML schemas exist which define a plurality of complex data types that may be used by the web service 106 when interfacing with other web services and compatible application interfaces. Consequently, it is possible to include references to such XML schemas when formulating the data types of the WSDL file 108.

Further in the example of FIG. 1, as shown, the WSDL file 108 may include a number of messages which are specified using the previously defined data types. As is known, such messages may include a request for information, an associated response providing such information, a request to modify or delete data, or queries for executing a search for data, to give a few examples. Although not specifically, illustrated in the example of FIG. 1, each message may include zero or more parts which may be used, e.g., to define a nested message structure within a given message.

All such messages may be grouped in a desired manner to form actual interface operations between the web service 106 and other web services or compatible application interfaces. As shown, such operations may be included within one or more ports defined by the WSDL file 108 for executing communications using the web service 106. To provide a few non-limiting examples, such ports may thus include one or more operations which themselves include specific message transfer characteristics. Such message transfer characteristics may adhere to one or more known messaging patterns, such as, for example, request messages, notification messages, or request/response pairs of messages, or other known message interaction patterns.

Further examples of the structures and operations of the WSDL file 108 are provided herein, or would be apparent to one of skill in the art. For example, the WSDL file 108 may frequently include binding information which specifies a manner in which the operations are to be communicated over a computer network in question. For example, in the context of the public internet, such binding may include use of the hypertext transfer protocol (HTTP) and/or may include use of the simple object access protocol (SOAP) for exchanging messages. These and other known features which may be associated with the WSDL file 108 are not necessarily described here in detail, because, e.g., such features either may not be necessary to one of skill in implementing the example system 100 of FIG. 1, and/or because such further details would be apparent to one of skill in the art when implementing the system 100 of FIG. 1.

Although instrumental in allowing the web service 106 to interact and interface with other web services and web service compatible application interfaces, the WSDL file 108, by itself, is wholly insufficient to allow the business object based application environment 102 to utilize or otherwise benefit from the features and functionalities of the web service 106. Attempting to create a business object wrapper for the web service 106 is typically a time consuming and resource intensive effort, which is not feasible or convenient, particularly for large scale integration of a plurality of web services for use within the business object based application environment 102.

Further, even to the extent that such efforts are made, such efforts may not result in providing all of the features and advantages of the business object based application environment 102 with respect to the web service 106. For example, as referenced above, a software developer utilizing the business object based application environment 102 may not be enabled to make full use of the environment 102 when accessing the web service 106 using a manually created business object wrapper. In particular, as referenced above, the business object based application environment 102 may normally be associated with a number of developmental entities and associated development tools which may not be fully compatible with the web service 106. For example, it may be difficult or impossible for a developer using the environment 102 to incorporate features of the web service 106 into a graphical user interface being constructed using the business object based application environment 102. In a further example, it may be similarly difficult for the software developer to generate reports using data associated with the web service 106.

Consequently, the business object based application environment 102 may be configured to automatically generate a business object representing the web service 106, based on the commonly available WSDL file 108 associated therewith. As a result, the software developer may be enabled to gain access to the features and functionalities of the web service 106 within the context of the business object based application environment 102. Further, the software developer may be enabled to do so with a minimum of time and effort, while nonetheless being provided with a full range of the features and functions of the business object based application environment 102 with respect to the web service 106 when developing or using a software application.

Thus, in the example of FIG. 1, the business object based application environment 102 may include a metadata repository 110 and a business object generator 112 which may be configured to interoperate, among other functions, to automatically generate a business object 114 based on the WSDL file 108. In this regard, and as referenced above, it may be appreciated that the business object based application environment 102, and, specifically the metadata repository 110 and the business object generator 112, may include or provide various conventional features and functions which are not necessarily specifically described or illustrated herein.

For example, during standard operations, the business object generator 112 and related components may be configured to receive information from a user which specifies a desired type of business object which the user wishes to create or utilize. For example, an appropriate graphical user interface (GUI) may be provided to such a user which guides the user with respect to a type and format of information required for conventional generation of business objects. For example, as also referenced above, the metadata repository 110 may include a number of development entities and associated development tools, which may allow a user of the business object based application environment 102 to create conventional business objects having desired functionality (e.g., user interface functionality or report generation functionality). Similarly, the metadata repository 110 may provide techniques for users of the business object based application environment 102 to combine two or more conventional business objects in a desired manner to obtain a desired result. As already described, such conventional functionality is, by itself, well known in the art, and therefore is not described here in further detail except as may be necessary or helpful in understanding example operations of the system 100 of FIG. 1.

In the specific example of FIG. 1, the business object generator 112 is configured to automatically provide the business object 114 such that the business object 114 effectively exposes or otherwise provides the underlying features and functions of the web service 106. Further, the business object generator 112 is configured to provide the business object 114 such that the business object 114 is fully compatible and integrated with any or all remaining business objects associated with the business object based application environment 102, including e.g., other business objects generated from other web services, as well as other business objects which are created using standard or conventional techniques.

In the example of FIG. 1, the business object 114 is illustrated as including input 116 which defines or otherwise specifies an input required by the business object 114 to provide associated behavior or other action. An action 118 represents the resulting behavior as such, i.e., the action which results in response to receive the input 116.

Meanwhile, a node 120 illustrates and conceptually represents a node-based structure of the business object 114. Specifically, as is known, such business objects may include a hierarchical or other relationship of a plurality of associated nodes, where, as described herein, each such node and business object is associated with defined behaviors, data, and other characteristics which are commonly defined with respect to a specified entity.

As is known, such a node-based structure for a business object may generally include a root node, as well as specified associations between the root node and any underlying nodes of the same business object. Specific examples of such structures are illustrated in more detail below, e.g., with respect to FIGS. 3 and 5. In the simplified example of FIG. 1, however, the node 120 is illustrated in the singular, for purposes of clarity and conciseness in describing the provided example operations of the system 100 of FIG. 1.

In this regard, FIG. 1 illustrates that the node 120 may further be associated with node specific identifying information 122 which provides information which facilitates the use of the business object 114. For example, as shown, a node ID may be included which provides an identifier for uniquely locating the business object 114 within a larger database or memory. Further, as also shown, associated information about a nature and use of the business object 114, and, specifically, the node 120, may be included.

Finally with respect to the business object 114 in the example of FIG. 1, node properties 124 are illustrated which define types of operations which the business object 114, and, specifically, the node 120 is capable. In a particular example, it may occur that the node 120 is associated with a finite, predefined set of operations, such as, e.g., operations including the creation, reading, querying, or deletion of data included with, or associated with, the node 120. For example, a particular example of the node 120 may be associated with performing read operations, in which case, remaining ones of the available operations may be disabled for purposes of the node 120. In this way, a user of the system 100 may be limited from having to instruct certain basic functionalities associated with the node 120, and, instead, the business object generator 112 may be enabled to select from a predefined, constrained number of possibilities for implementation by the node 120. In specific examples, of course, it may be possible for the user to combine, modify, or otherwise enhance a use of the node 120, as would be apparent to one of skill in the art.

Thus, in generating the business object 114 using the WSDL file 108 to thereby provide features and functions of the underlying web service 106, the business object generator 112 may be configured to analyze the WSDL file 108, identify and abstract those portions thereof which may be useful in generating the business object 114, and thereafter provide a mapping or other conversion of identified elements of the WSDL file 108, to thereby generate the business object 114. In the example of FIG. 1, the business object generator 112 thus includes a WSDL inspector 126 which, as just referenced, is configured to analyze, parse, or otherwise inspect the WSDL file 108. In specific examples, the WSDL inspector 106 may be configured to receive an identification of the web service 106 from a user of the business object based application environment 102, and to thereafter use conventional techniques or searching for or otherwise identifying and accessing the web service 106. Further, the WSDL inspector 126 may be configured to locate, download, or otherwise obtain the WSDL file 108, using conventional techniques, or, in some implementations, may be directly provided with the WSDL file 108 from the user.

The WSDL inspector 126 may thus be configured to inspect the WSDL file 108 and to extract and provide various portions thereof, (e.g., data types, messages, and ports, and associated operations). For example, as described in more detail below, the WSDL inspector 126 may be configured to extract the data types of the WSDL file 108, and to thereafter store the extracted data types as data types 127 within the metadata repository 110. That is, the WSDL inspector 126 may be configured to map or otherwise convert the data elements of the WSDL file 108 into a formatting structure which is compatible with existing data types and associated requirements stored in, or imposed by, the metadata repository 110.

Further, an input mapper 128 may be configured to determine one or more input messages associated with one or more operations of the WSDL file 108, and to thereafter map such an input message(s) to thereby create the input 116 to the business object 114. Similarly, an action generator 130 of the business object 112 may be configured to generate the action 118 to thereby represent or enable one or more operational exchanges associated with an operation of the WSDL file 108.

Using the thus-provided input 116 and action 118, a node generator 132 may be configured to access such information together with the data types 127 to thereby generate the node 110 and associated information and properties 122, 124. For example, the node generator 132 may be configured to access a relevant data type in order to thereby provide a semantically meaningful name for the node 120, e.g., a name which represents functionality of the messages/operations constructed using such data types, which therefore represent the newly generated behavior and associated data of the business object 114. Similarly, the node generator 132 may analyze the provided structures associated with the messages (and associated data types/operations) of the WSDL file 108, to thereby identify, describe, and enable the associated capabilities, characteristics, and other properties associated with, or included in, the business object 114.

As already described, the business object 114 may include various other features not specifically illustrated in the simplified example of FIG. 1. For example, as illustrated below with respect to FIG. 5, the business object 114 may include a root node, and two or more nodes which are associated with one another and which, by their association, represent or enable relevant functionality or features of the underlying web service 106 (for example, such node associations may be used to represent a nested message structure including within the WSDL file 108).

Further, in an example or default implementation, the system 100 may be configured to provide a fully automatic conversion or generation process in which the business object 114 represents and provides functionality associated with the web service 106. In other example implementations, a user of the business object based application environment 102 may be required, or may desire, to introduce additional or alternative features or functions associated with the business object 114 representing the web service 106. For example, such a user may wish to provide additional metadata or otherwise make use of available development tools within the metadata repository 110 to obtain a desired result. In particular, it may occur that the user wishes to generate the business object 114 from two or more web services, rather than merely from the single web service 106 illustrated in the simplified example if FIG. 1.

In these and other context, a transformation definition 134 may be included within the metadata repository 110 which provides the user with the ability to make such additional or alternative features available, in a manner which is standardized and convenient for the user. More detailed discussion of the transformation definition 134 is provided herein, e.g., with respect to 7.

In the example of FIG. 1, the system 100 is illustrated as executing using at least one computing device 136, including at least one processor 136A and computer readable storage medium 136B. In the example, the business object based application environment 102 is illustrated as being implemented with the at least one computing device 136, i.e., may be understood to include executable code stored on the computer readable storage medium 136B which, when loaded for execution onto the processor 136A, is configured to provide the various features and functionalities described herein with respect to the web service 106 and the resulting business object 114.

Of course, it may be appreciated that FIG. 1 represents one or more non-limiting examples of possible implementations of the system 100, and that many other variations are possible. For example, in common scenarios, the application 104 and associated web service 106 may be understood to run on a remote computing device, although not explicitly illustrated as such in the example of FIG. 1. Similarly, the compute readable storage medium 136B or other appropriate storage medium, which may be internal or external to the at least one computing device 136, may be used to store the business object 114 and any related data.

Thus, although the example of FIG. 1 illustrates a number of separate and distinct components, it may be appreciated that, in other variations, two or more such distinct components may be combined into fewer components (e.g., into a single component). Conversely, distinct components illustrated in FIG. 1 also may be separated for executing separate corresponding functions. For example, a given component of FIG. 1 may be partially or completely executed on a local computing device, while a remaining portion and/or other components may be executed on a remote computing device. Thus, it may be observed from the example of FIG. 1 that the features and benefits of the system 100 may be obtained in virtually any type or combination of computing/network configurations.

Figure 2:
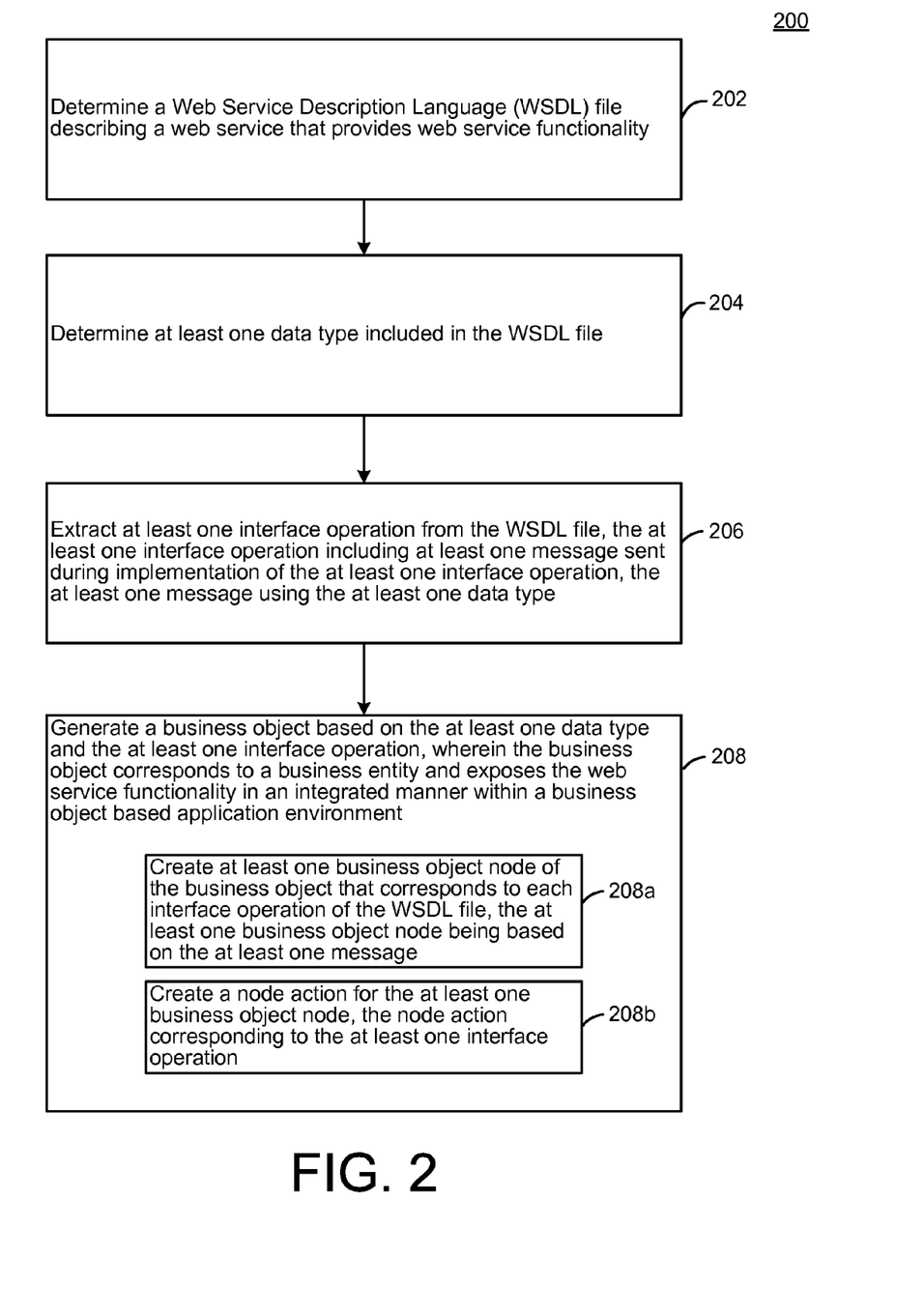
FIG. 2 is a flowchart 200 illustrating example operations of the system of FIG. 1.

FIG. 2 is a flowchart 200 illustrating example operations of the system 100 of FIG. 1. In the example of FIG. 2, operations 202-208 are illustrated in sequential order. However, it will be appreciated that many other variations of the operations 202-208 and/or related operations may be implemented. For example, two or more of the operations 202-208 may occur in a partially or completely overlapping or parallel manner. Further, operations may appear in a different order than that shown, may include additional or alternative operations not specifically illustrated in the example of FIG. 2, or may omit one or more of the operations 202-208.

In the example of FIG. 2, a web service description language (WSDL) file describing a web service that provides web service functionality may be determined (202). For example, as described above, the WSDL inspector 126 may be configured to determine the web service 106, using conventional web service discovery techniques, and/or at the specific request of a user.

At least one data type included in the WSDL file may be determined (204). For example, the WSDL inspector 126 may determine the data types from the WSDL file 108, and may convert the determined data types as needed for storage within the metadata repository 110 as data types 127.

At least one interface operation from the WSDL file may be extracted, where the at least one interface operation includes at least one message sent during implementation of the at least one interface operation, and wherein the at least one message uses the at least one data type (206). For example, the WSDL inspector 126 may extract messages of operations of the WSDL file 108, as described herein. As also described herein, such messages may be constructed based on the previously determined data types, expressed as the data type 127 as stored within the metadata repository 110.

A business object may be generated based on the at least one data type and the at least one interface operation, wherein the business object may correspond to a business entity and may expose the web service functionality in an integrated manner within a business object based application environment (208). For example, the business object generator 112 may be configured to generate the business object 114 based on the previously determined interface operations and underlying messages and data types. As described, the business object 114 may be fully compatible with other business objects formed within, or used in association with, the business object based application environment 102.

Further, the generating of the business object may include creating at least one business object node of the business object that corresponds to each interface operation of the WSDL file, where the at least one business object node may be based on the at least one message (208a). For example, the business object generator 112 may generate the business object node 120 based on the data types 127. Further, as described in detail herein, a structure of the business object node 120 and associations thereof with one or more additional business object nodes may be based on the underlying message structure. For example, if the WSDL file 108 includes nested messages, then such nesting may be represented using the at least one business object node 120 by associating corresponding business objects for the respective nested message parts.

The generating of the business object may further include creating a node action for the at least one business object node, where the node action corresponds to the at least one interface operation (208b). For example, the business object generator 112 may generate the action 116 which helps define the behavior of the business object, e.g., the business object node 120, so as to correspond to the respective interface operation of the WSDL file 108.

Figure 3:
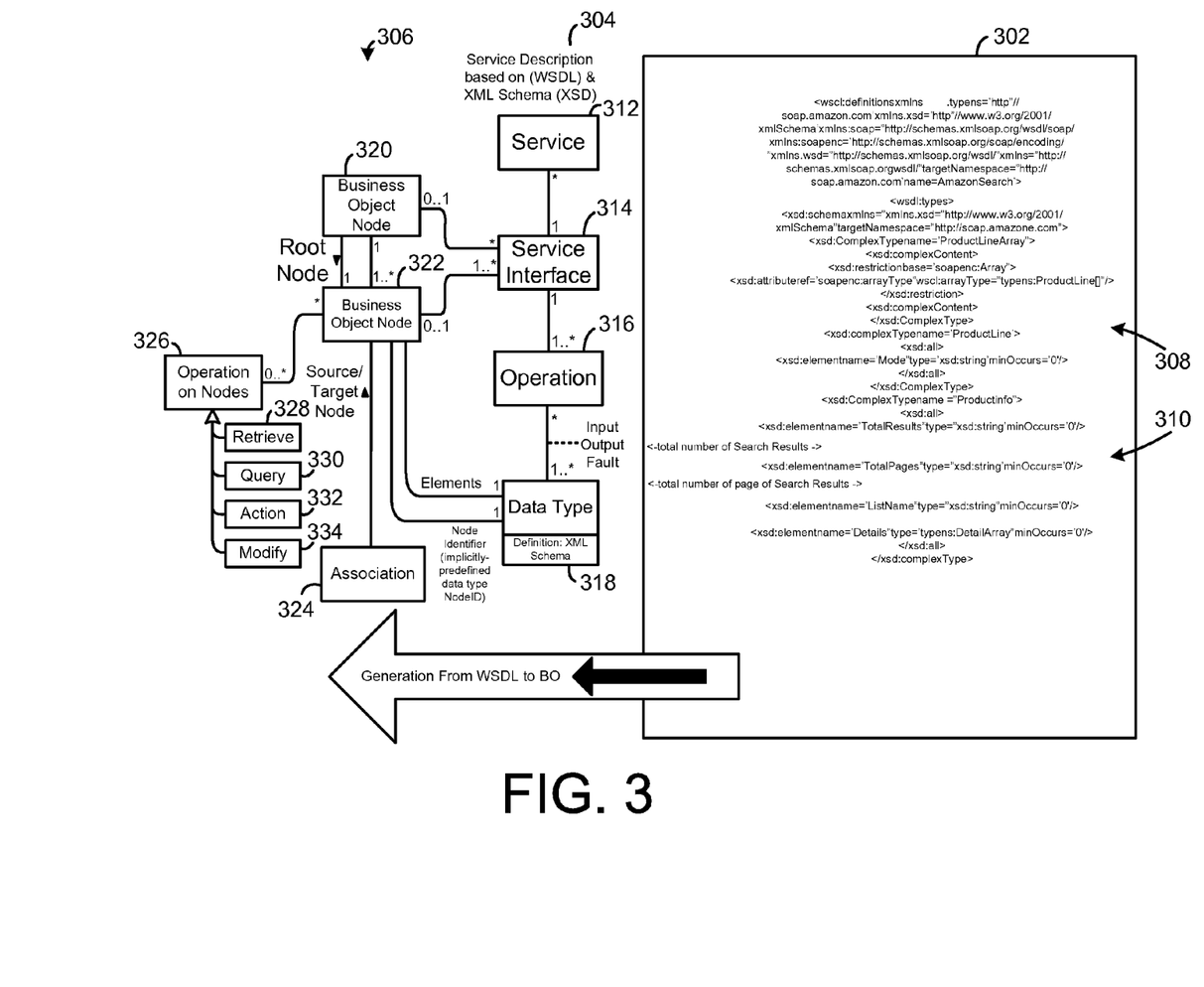
FIG. 3 is a block diagram illustrating a generation operation according to FIGS. 1 and 2.

FIG. 3 is a block diagram illustrating an example conversion process which may be implemented by the system 100 of FIG. 1. In the example of FIG. 3, an example portion 302 of the WSDL file is illustrated as being parsed to obtain a service description 304, from which a resulting business object 306 may be generated. That is, as described above with respects to FIGS. 1 and 2, the WSDL inspector 126 may be configured to determine the WSDL file 302, and to extract portions thereof for inclusion within the service description 304. The business object generator 112, based on outputs of the WSDL file inspector 126 and the input mapper 128 and action generator 130, may thus generate the business object 306.

In the specific example of FIG. 3, the WSDL file 302 is illustrated as including an example related to a web service which enables a search of a retailer's products, such as may be used by a consumer wishing to locate information about a particular product. In the example, a portion 308 provides, e.g., various data type definitions, as well as a particular complex data type defined with respect to a product line of the online retailer. Meanwhile, a portion 310 includes a second complex data type related to information about a related product line. Of course, the example of the WSDL file 302 should be understood to represent a partial, concise example of a portion of a WSDL file, for purposes of illustrating the service description 304 and the business object 306. More complete and more detailed examples of WSDL files are provided herein, e.g., with respect to FIG. 4, or would be apparent to one of skill in the art.

As shown, the service description 304 may include an identification of the service 312, as well as associated or included service interfaces 314. As described herein, the service interface 314 may include one or more operations 316, where such operations may include, e.g., input/output/fault messages which are constructed using data types 318. As described, the data types 318 may be represented in a format suitable for use by the business object generator 112 in generating the business object 306. In particular, as shown, such data types may be at least partially defined in terms of pre-existing XML schemas associated with the data type 318.

Thus, based on the service description 304, the business object 306 may be generated. As shown and described, the business object 320 may be defined or described at a root node, to which one or more other business object nodes 322 may be connected by way of one or more associations 324.

As also described, one or more operations 326 may be specifically defined and parameterized as being associated with operation of the business object node 322. In the example of FIG. 3, such operations are illustrated as potentially including a retrieve operation 328, a query operation 330, an action 332, and a modify operation 334. As described, one or more of the operations 326-334 may be enabled or disabled, as may be necessary for an operation of the business object 322.

As described, the service interface 314 may be used as a basis for identifying and describing operations of the business object node 322. Further, the data type 318 may service the basis for generating the particular business object node 322, e.g., may be used to derive a name for the business object node 322 and its associated elements.

Thus, FIG. 3 illustrates an example in which WSDL sources may be downloaded directly from a service provider or provided as a WSDL file. To find the appropriate web service, a registry for discovery may be provided by the web service provider's infrastructure. Such provider-specific web service discovery also may be supported by the Metadata Repository 110.

Thus, the user may specify one or more web services used to generate a business object. The WSDL sources may be uploaded either as a WSDL download or as a file and exposed to the end user. In an example default generation variant, the end user will be able to generate a business object out of a web service without need for any additional metadata maintenance. In this case, as described, for each web service interface operation business object nodes are created. The node structures may be derived from the parameter structures of the input and output message types belonging to the interface operation. In case of nested structures, a set of nodes with parent-child association may be created accordingly. In example scenarios, the user may generate a business object for a collection of web services. In such cases, the user may maintain additional metadata used by the business object generator in order to specify the relationship between the business object nodes (e.g., parent-child relationship). Also each web service may contain or reference a context, and scenario-dependent collection(s) of web services can be defined and wrapped in one business object. Based on the WSDL, the additional metadata maintained by the developer, and (in some example implementations) a corresponding generation template, the business object generator 112 generates a business object structure and its appropriate default implementation. The generated business object exposes the wrapped web service functionality as regular business object functionality and enables a seamless integration of web service functions in business object based applications.

As described above, web service input, output, and fault message types may include different complex and/or elementary data types describing the operation parameters (e.g., the input structure for a modifying operation). For example, for each complex data type, a corresponding structured data type may be generated in the Metadata Repository 110, as described above. Elements may be mapped automatically to corresponding simple data types based on Core Component Technical Specification (CCTS) standard wherever possible. If the data type mapping is technically difficult or not possible, an action item for the developer may be generated to maintain or finalize the mapping manually. For nested complex data types, several complex flat data types may be generated (one per nested level). UI texts for business objects entities (e.g., business object nodes, or business object node elements) may be derived from the data type name of the operation parameter, as referenced above and as described and illustrated below with respect to FIG. 5. If the UI text does not match the semantics of the data type, then the UI text may be maintained by the developer manually.

As described above, the business object structure may be derived from message types of the web service operations. Once the relevant data types are created, the business object generator 112 may begin to generate the business object hierarchal structure which includes nodes and associations. In example implementations, the business object structure will be generated as a one level hierarchy, in which case all generated nodes may be associated via composition association directly to the root node. In example cases such as the following, however, a generated node will be associated or be a child of a non root node. Specifically, in cases in which the input and/or output structure of a web service interface operation is a nested structure, in which case the operation may be mapped to a hierarchy of nodes. The nodes level may correspond also to the nested structure level(s). In another example case, generation of a business object may occur out of a collection of self contained web services that are semantically dependent on each other (from consumer perspective), for example, e-commerce web services. In such cases, additional metadata may be needed and may thus be modeled in the metadata repository 110. Those metadata may be interpreted by the business object generator 112 during the business object generation step.

As referenced above, business object generation may be done following a generation template. The choice of template may depend on, e.g., the usage of a web service or web service collection. A web service can be used, e.g., to perform a query- or read-operation or to create new data. The web service can be mass-data enabled or enabled to work only on a single instance. The template may influence the described transformation and mapping algorithm from the message to the business object with respect to Supported CRUD (create, retrieve, update, delete) services, availability of query services, defined actions, and node properties. Appropriate out bound agents will be also created accordingly based on the provided WSDL in order to dispatch the call to the integrated web services.

An example default business object generation may be implemented as described below, and as described and illustrated in more detail with respect to FIGS. 4-6. For example, for each read service operation, a business object node may be created. The business object node may be primarily specified using the node element structure and the core services, some or all of which may be executed on the business object node (s). the example of read operation mapping, only the Read Core Service will be enabled. The other services will be disabled via static business object node properties. In case of nested result structure(s), a set of business object odes may be created in order to reflect the result structure.

Meanwhile, each modifying operation may be mapped to nodes with actions. The action and the action input parameters may be used to pass the input parameters and invoke the corresponding operation. The node element structure may correspond to the operation result structure. The node properties may be set accordingly.

Further, search operations may be mapped to business object queries. Similarly to the business object actions, the query parameters and result structure may be mapped to business object query parameter and node element structure.

Error messages occurring as a result of web service call(s) may be exposed by the generated business object as business object error messages with the possibility of context specific message transformations. The needed message transformation may be created and registered in the Metadata Repository 110. The registered messages may be derived from the WSDL automatically, if, e.g., the result messages are explicitly declared in the WSDL. In cases where the messages are not explicitly modeled in the WSDL, the message transformation (message mapping) can be defined in a declarative way after the business object generation steps.

Validation and constraints may be generated automatically based on information provided in the WSDL. The validation and constraints may be generated as Enterprise Service Framework validation and determination. The validation may thus enable getting the input data needed for a web service call in the expected format, and providing some or all required input parameters.

For example, formal and plausibility checks (e.g., date/ time), may be conducted, while existence check(s) for code value also may be performed. Additional constraints and validation raised in the context of web service collection may be maintained in a declarative way.

The generated business object may be exposed to a consumer at runtime, similarly to other classical business objects. A new business object category called Web Service Integration business object will be introduced as matter of convenience and design time tool optimization. The generated business object will participate in all standard transactional phases defined by the ESF. One example possible difference between classical business object and the generated BO is that the generated BO, in some example implementations, does not have its own data persistency. The data, e.g., may be read and written remotely via web service call.

Query and read web service operation(s) may be invoked when a query or retrieve core service is invoked on the corresponding business object node. Modification web service operations may be invoked when the corresponding actions on the business object node are executed. Invocation of the web services will be done within the accordingly generated outbound agents. In order to avoid data inconsistency the generated business object actions may be exposed on the user interface as submit actions (e.g., Action+Save and the user interface floorplan may be used with the save and continue pattern).

FIG. 4 is an example of a portion 400 of a WSDL file. Specifically, the WSDL file portion 400 of FIG. 4 is provided for the sake of illustration and understanding, and, more specifically, with respect to the specific examples of FIGS. 5 and 6, below. As such, the WSDL file portion 400 does not necessarily illustrate a complete or representative WSDL file, and it may be appreciated that many variations and additions may be included in actual WSDL files processed by the system 100. Moreover, inasmuch as the WSDL file portion 400 merely represents a non-limiting partial example of a WSDL file, the below description does not necessarily provide detailed explanation of all elements of the WSDL file portion 400, and, in particular, does not provide explanation for those elements which would be known to one of skill in the art.

In the example of FIG. 4, a section 402 includes and defines, or otherwise identifies, relevant data types to be used in interfacing with an underlying web service. As shown, the data type portion 402 is delineated through the use of corresponding data type tags which are conventional to XML, and include a plurality of specified complex data types.

As described in detail herein, the WSDL file portion 400 generally corresponds to a WSDL file and corresponding web service which is designed to receive an identification of a customer, and to provide certain customer information in response thereto. Specifically, in response to a request which includes an identification of a customer, the web service in question may reply with, e.g., address information and one or more associated phone numbers which are associated with the customer.

Thus, within the data type section 402, a first complex data type defining an address description and a manner in which the address description is expressed and provided may be included as having certain associated elements related to the address description, including reference to phone number information. Specifically, as shown, a subsequent complex data type may be defined and referenced in a section 406 which specifies a manner in which the phone number information may be provided, e.g., as an array.

In the example of FIG. 4, the phone number information is provided as a nested structure within the larger, related data type associated with the address information. Consequently, as shown in a nested portion 408, data types may be defined which relate to, and specify, more specific manners in which the customer's phone numbers may be expressed and provided.

In a subsequent section 410, messages are defined which are based on the previously defined data types. Specifically, as shown, a message "get address info request" is illustrated as having a part which is named customer ID, and which thus, based on the underlying data types, specifies the customer ID as an input. In a subsequent message section 412, a message "get address info response" is defined as a response message having one or more corresponding parts for responding to the input of the customer ID. Subsequently, in an operations section 414, an operation is defined based on an exchange of the messages "get address info request" being received, and the response message "get address info request" being sent in response thereto.

Figure 5:
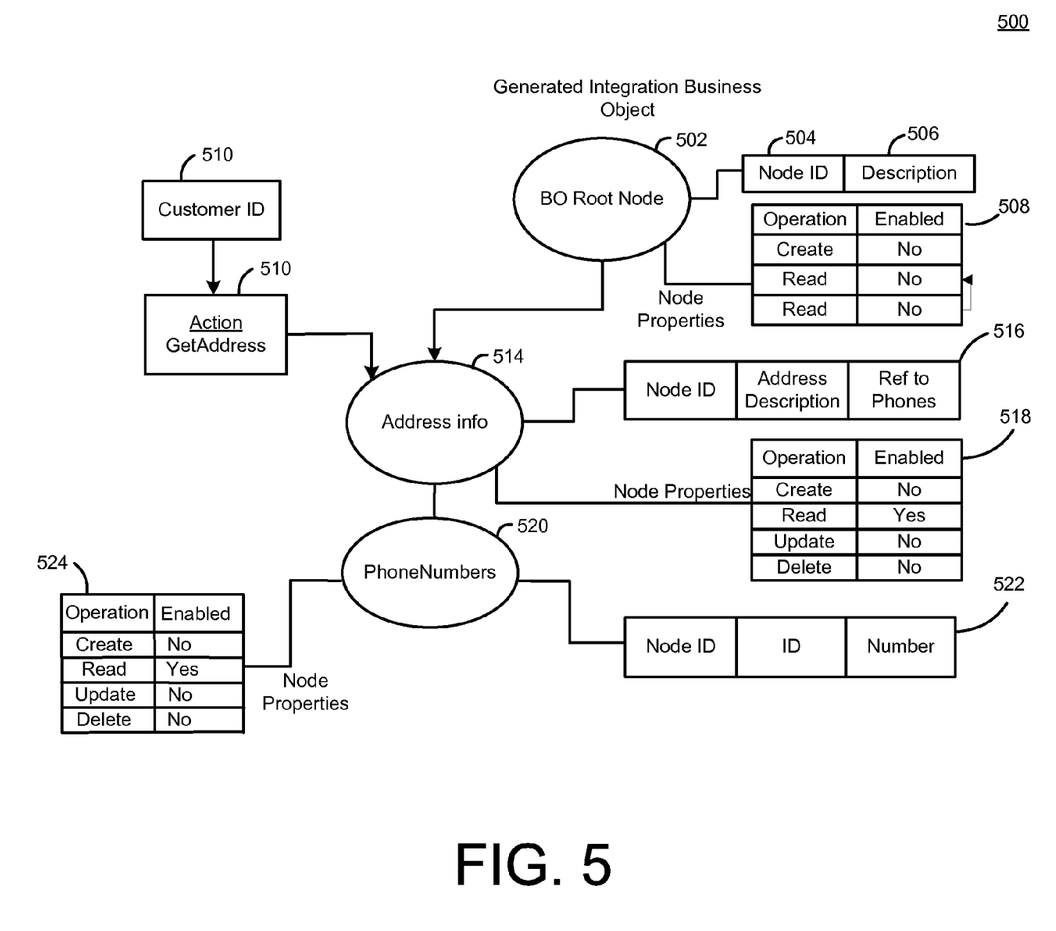
FIG. 5 is a block diagram of a generated business object.

FIG. 5 is a block diagram of a business object 500. That is, the business object 500 of FIG. 5 provides a more specific example of the business object 114 of the example of FIG. 1. In particular, the business object 500 corresponds to a business object which may be generated by the system 100 based on the WSDL file portion 400 of FIG. 4.

In the example of FIG. 5, a business object root node 502 is generated. The root node 502 may be associated with a corresponding node ID 504 and associated description 506, along with properties 508. As is known, the root node 502 may not be used to perform an actual function, by itself, or otherwise execute business logic or other behaviors. Rather, the root node 502 may be used to define a general purpose or function of the business object 500 as a whole, and may serve as a point of identification, characterization, and location for the business object 500. As such, it will be appreciated that the node ID 504 may provide location of the root node 502, and thus of the business object 500 as a whole, within a larger database or other memory.

Meanwhile, the description 506 may provide a general purpose or function of the business object 500, and similarly, the node properties 508 may relate to, or describe, specific functions that are executed by associated nodes which are linked to the root node 502 within the business object 500. Thus, it may be appreciated that the semantics of the naming of the root node 502 and the inclusion of the description 506 may generally be determined by the WSDL inspector 126, e.g., based on analysis of corresponding semantics and naming conventions of the data types as converted and expressed within the data type 127 of the metadata repository 110. Meanwhile, the node properties 508, e.g., whether the business object is generally designed to perform one or more functions such as, e.g., creation, reading, updating, or deleting of data.

Further in the example of FIG. 5, an input 510 is illustrated which defines an action parameter input structure which is compatible with the business object 500 and generally with the business object based application environment 102. As referenced above with respect to FIG. 1, the input mapper 128 may be configured to perform a mapping of a corresponding operation input message to the action parameter input structure of the input 510. In the example of FIG. 5, as described above with respect to FIG. 4, the operation input message is defined based on receipt of a customer identifier, which may thus be mapped by the input mapper 128 to a suitable action parameter input structure for the business object 500.

Specifically, the action parameter construction of the input 510 may be configured to be suitable for a node action 512 which defines one or more behaviors to be executed by the business object 500. In the example of FIG. 5, the action "get address" is defined within the action 512. More generally, as described above, with respect to the action generator 130, such a node action may be generated for each WSDL operation of the WSDL file in question.

Further in the example of FIG. 5, a node 514 is generated that is based on, e.g., corresponds to, a message of the WSDL operation associated with the action 512. Similarly to the root node 502, the node 514 may be associated with node information 516 and corresponding node properties 518. Specifically, as shown and described, the node 514 may be associated with node information 516 which includes an identifier of the node 514, as well as information about the node 514. Specifically, the node information 516 includes an address description and a reference to phone number description. That is, as described above with respect to FIG. 4, the WSDL file portion 400 includes a nested message structure in which the first message relates to address information, and includes a nested reference to phone number information. Consequently, this information is generated with respect to the node 514.

Semantics for the naming of the node 514 may be determined from corresponding semantics associated with the underlying data types of the message or messages in which the node 514 is based. Thus, in the example, the node 514 is named "address info" which is derived from the corresponding address info data type of FIG. 4.

Further, node properties 518 for the node 514 may be defined which specify enabled and/or disabled operations which may be executed by the node 514. Specifically, in the example, the node 514 is illustrated as having the read action enabled while the creation, update, and deletion actions are disabled. Such properties thus correspond to the functionality of the message on which the node 514 is based, i.e., the reading and retrieval of desired address information based on the input customer ID 510.

As with the node 514, the business object generator 112 may be configured to further generate a node 520 which is associated with, e.g., a child node of the parent node 514. As referenced above, the business object generator 112 may be configured to generate the node 520 having the association with the parent node 514, based on output of the WSDL file inspector 126 which identifies the fact that the phone number related message is nested within the larger address information message. For example, the WSDL file inspector 126 may determine that message parts which contain list elements should be split into two nodes, such as the node 514, 520.

Subsequently, the node 520 may be generated, named, and otherwise structured in a manner very similar to that just described above with respect to the node 514. Specifically, the name (i.e., "phone number") of the node 520 may be derived from the semantics of the data type on which the corresponding message is built. Meanwhile, the node information 522 may include a node identifier for the node 520, and an identifier associated with a customer in question, and the associated phone number for the customer in question. Finally with respect to FIG. 5, as with the node properties 518, the node properties 524 for the node 520 may be generated. Specifically, as referenced above and similarly to the node properties 518, the relevant operation result message may be mapped to corresponding node element structures associated with the node properties 524, e.g., the associated enabled/disabled operations. In this regard, as with the node 514, the node properties 524 may specify that a read operation is enabled, while creation, updating, and deletion operations are disabled.

Thus, the business object 500 may be automatically generated based on the underlying WSDL file portion 400. In a default implementation, the business object may be completely created and stored as such within the business object based application environment 102, and may be completely available for integration with other business objects, or other desired use by a user of the environment 102. In other example implementations, it may be necessary or desirable for the user of the business object based application environment 102 to enhance or otherwise modify the business object 500. For example, the user may edit the derived names or other structures of the business object 500, or may provide associated metadata therewith. In any case, it may be appreciated that the user of the business object based application environment 102 may be greatly facilitated in creating and subsequently using business objects which may fully leverage an availability and functionality of available web services.

Figure 6:
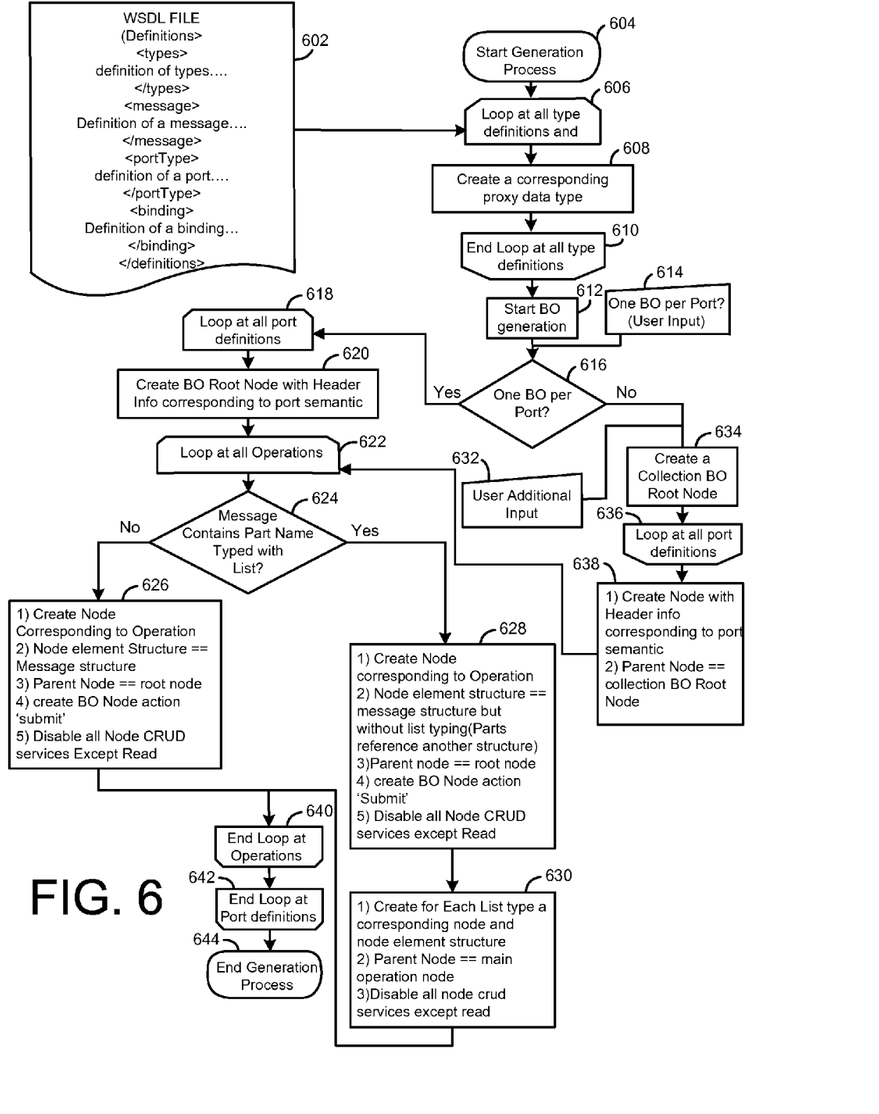
FIG. 6 is a flowchart illustrating more detailed example operations of the system of FIG. 1.

FIG. 6 is a flowchart 600 illustrating a more detailed example of operations of a system 100 of FIG. 1. In the example of FIG. 6, operations 604-644 are illustrated with respect to WSDL file 602. As shown, and as may be understood from the above description, the sample WSDL file 602 may include various data types and associated definitions thereof, one or more messages built on the data types, and defined within the WSDL file 602 (including any separate and/or nested message parts within one or more messages), various port types associated with one or more operations implemented using the previously defined messages, and at least one network binding technique defining a manner in which the operation messages are transported over one or more relevant computer networks.

Thus, at the start of a business object generation process (604), the WSDL inspector 126 may begin inspections of the WSDL file 602, including executing an inspection loop over all available data type definitions (606). At each such loop, a corresponding proxy data type may be created and stored with the metadata repository 110 as the data type 127 (608). Such loop operations over the available data type definitions may continue until all data type definitions have been inspected (610).

Subsequently, corresponding business object generation processes may be started (612). As described above, it is possible that one or more user inputs may be permitted or required during execution of the flowchart 600 or other implementations of the system 100 of FIG. 1. In the example of FIG. 6, user input may be received which defines whether to include one or more business objects per port of the WSDL file 602 (614).

If the user selects one business object per port (616), then the business object generator 112 may begin loop operations over all port definitions previously provided by the WSDL inspector 126 (618). During each such loop operation, the business object generator 112 may create a business object root node which is provided a default name and other identifying information based at least in part on a semantics of the corresponding port (620).

Subsequently, the business object generator 112 may provide nested loop operations within a current port definition, to thereby loop over all operations included within a current port definition being considered (622). In the simplified, specific example of FIG. 6, the illustrated operations demonstrate business object generation for a one way operation, e.g., in which the operation is able to receive a message but does not return a response message. More detailed examples in which other, more complicated message patterns are enabled would be apparent based on the example of FIG. 6 in conjunction with the remaining descriptions provided herein.

Thus, generally speaking, it will be appreciated that loop processing over a given operation may include individual consideration of each message and/or message part contained within the operation currently being considered. Specifically, as shown, the business object generator 112 may initially determine whether a considered message contains a part name associated with a "list" type (624). In other words, as described above, the business object generator 112 may determine whether the message in question contains a nested message. If not, the business object generator 112 may create a node corresponding to the operation in question, in which the node element structure is defined based on the message structure of the message in question, and which the parent node of the created node of the previously created root node.

In the example, business object generator may further create or enable a business object node action (e.g., "submit"). That is, as described above with respect to FIG. 1 and FIG. 5, the action generator 130 may be configured to map the message of the operation in question to an action which is taken by the business object to be created in response to a received input. Further in the example, the business object generator may disable all node services (create, update, delete) except the "read" service (626).

If, however, the message in question contains a part name typed with "list" (624), then the business object generator 112 may take the same actions as described above with respect to operations 626, except that when creating the node element structure based on the underlying message structure, the business object generator 112 may create the node element structure without list typing, because the message parts reference another message structure (628). Consequently, the business object generator 112 may additionally create for each list type a corresponding node and node element structure, in which a parent node of the newly created node is the previously created node, and, further, the business object generator 112 may disable all node services except "read" for the additionally-created child node (630).

In additional or alternative operations, as referenced above and illustrated in the example of FIG. 6, it may previously occur that the user selects one business object for all ports (616). In this case, based on additional user input (632) characterizing a manner in which the multiple ports will be associated and interact which each other, the business object generator 112 may create a collection business object root node (634) which will be associated with more than one primary child node. Thus, a collection of web services/ports may be mapped to one business object in such examples.

The business object generator 112 may then begin loop processing over all available port definitions at this point (636). During such loop processing, the business object generator 112 may create a node with a name and other identifying information which corresponds to the semantics of the port in question, and in which the parent node is the collection business object root node (638).

Thus, operations of the flowchart 600 may continue as described above with respect to operation 622-630, until loop processing for all relevant operation reach an end (640). In this way, an overall loop processing of available port definitions also may conclude (642), at which point the business object generation process completes (644).

Figure 7:
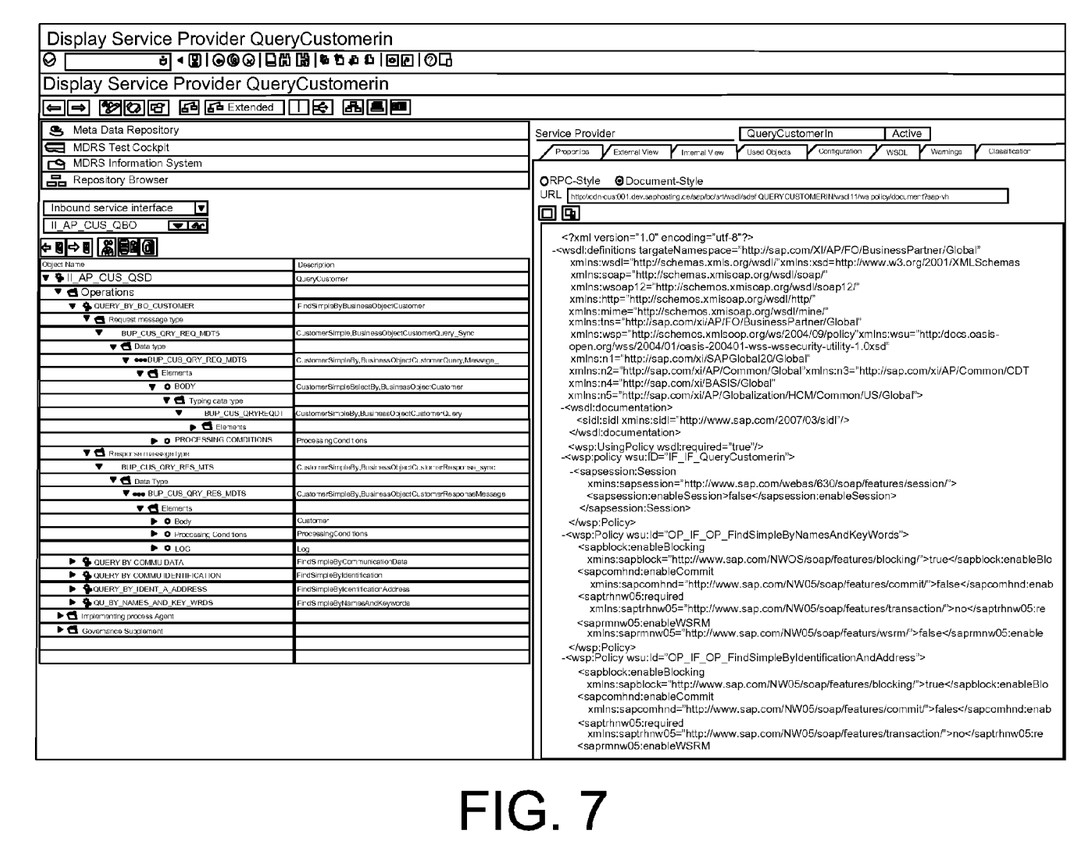
FIG. 7 is a screenshot illustrating a business object data structure for representing a WSDL file.

FIG. 7 is a screenshot 700 illustrating a structure representation for a corresponding WSDL. The example of FIG. 7 is specific to the ByDesign System of SAP AG; however, other such structure representations in other context may be constructed in a conceptually similar manner.

Figure 8:
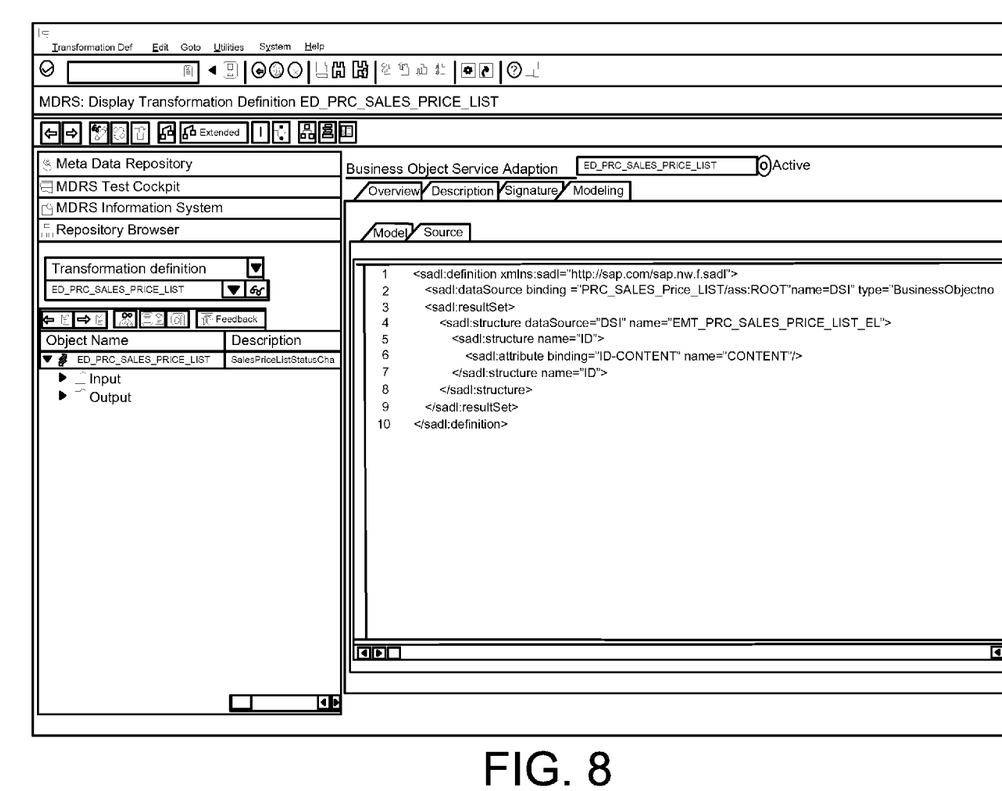
FIG. 8 is a screenshot illustrating a transformation definition for transforming two or more web services into a business object.

FIG. 8 is a screenshot 800 illustrating a transformation definition for the example of FIG. 3, above. In the example of FIG. 8, in case of business object generation out of a web service collection, as referenced above, additional metadata may be needed and may be maintained by the developer. Such additional metadata may include, and may be maintained, using a Metadata Repository transformation definition component. In this component, additional transformation rules may be maintained which may be used by the business object generator 112 during the generation. The component may be enhanced to support a new transformation category. The new transformation category may be named, e.g., WSDLS to Business Object. Thus, FIG. 3 shows the transformation definition component in the Metadata Repository 110, which may be enhanced. FIG. 3 shows a transformation definition form business object to WSDLs, in order to support modeled event agents.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions stored on a non-transitory computer-readable medium and executable by at least one processor of one or more computing devices, the system comprising:
    a Web Service Description Language (WSDL) inspector configured to cause the at least one processor to:
        discover, using a registry of discoverable web services, an existing web service that provides web service functionality;
        receive a WSDL file describing the web service,
        loop over all data type definitions in order to determine at least one data type included in the WSDL file,
        create and store a proxy data type corresponding to the at least one data type which is available to a business object generator, and
        extract at least one interface operation from the WSDL file, the at least one interface operation including at least one message sent during implementation of the at least one interface operation, the at least one message using the at least one data type; and
    the business object generator is configured to cause the at least one processor to:
        generate a business object based on the WSDL file, the business object including the at least one data type and the at least one interface operation, the business object configured to expose the web service functionality in an integrated manner within a business object based application environment, the generating including:
            converting the at least one data type to a format consistent with the business object based application environment,
            creating at least one business object node of the business object that corresponds to each interface operation of the WSDL file, the at least one business object node being based on the at least one message, and
            creating a node action for the at least one business object node, the node action corresponding to the at least one interface operation.

2. The system of claim 1 wherein the at least one interface operation is included in one or more ports, and wherein the WSDL inspector is configured to cause the at least one processor to loop over all ports to extract each of the at least one interface operation.

3. The system of claim 1, wherein the WSDL inspector is configured to cause the at least one processor to loop over all of the at least one interface operation to determine each included message including the at least one message.

4. The system of claim 1 wherein a node element structure of the generated at least one business object corresponds to a message structure of the at least one message.

5. The system of claim 1 wherein one or more node service operations correspond to the at least one interface operation.

6. The system of claim 1 wherein a parent node of the at least one business object node is a root node of the generated at least one business object.

7. The system of claim 1 wherein the at least one business object node is named based on a semantics of the at least one data type.

8. The system of claim 1 wherein the business object generator is configured to cause the at least one processor to determine that the at least one message includes multiple parts, and to thereafter create at least two nodes, each corresponding to one of the multiple parts.

9. The system of claim 1 wherein the WSDL inspector is configured to determine at least two web services and corresponding WSDL files, including the web service and the WSDL file.

10. The system of claim 9, wherein the business object generator is configured to generate a collection business object based on the at least two WSDL files.

11. The system of claim 1 comprising an input mapper configured to cause the at least one processor to map an input message of the at least one interface operation to an action parameter input structure for the node action.

12. The system of claim 1 wherein the business object exposes messages occurring as a result of web service calls to the web service as business object messages.

13. The system of claim 1, wherein the business object generator is configured to generate validation constraints based on the WSDL file, and thereby enable validation by the business object of receipt and implementation of input parameters and format requirements for web service calls for the web service received therethrough.

14. A computer-implemented method comprising:
  discovering, by a computer, using a registry of discoverable web services, an existing web service that provides web service functionality;
  receiving, by the computer, a Web Service Description Language (WSDL) file describing the web service;
  looping over all data type definitions in order to determine, by the computer, at least one data type included in the WSDL file;
  creating and storing a proxy data type corresponding to the at least one data type;
  extracting, by the computer, at least one interface operation from the WSDL file, the at least one interface operation including at least one message sent during implementation of the at least one interface operation, the at least one message using the at least one data type; and
  generating, by the computer, a business object based on the WSDL file, the business object including the at least one data type and the at least one interface operation, the business object configured to expose the web service functionality in an integrated manner within a business object based application environment, the generating including:
    converting the at least one data type to a format consistent with the business object based application environment,
    creating at least one business object node of the business object that corresponds to each interface operation of the WSDL file, the at least one business object node being based on the at least one message, and
    creating a node action for the at least one business object node, the node action corresponding to the at least one interface operation.

15. The method of claim 14 wherein a node element structure of the generated at least one business object corresponds to a message structure of the at least one message.

16. The method of claim 14 wherein a parent node of the at least one business object node is a root node of the generated business object.

17. A computer program product, the computer program product being tangibly embodied on a non-transitory computer-readable storage medium and comprising instructions that, when executed, are configured to:
  discover, using a registry of discoverable web services, an existing web service that provides web service functionality;
  receive a Web Service Description Language (WSDL) file describing the web service;
  loop over all data type definitions in order to determine at least one data type included in the WSDL file;
  create and store a proxy data type corresponding to the at least one data type;
  extract at least one interface operation from the WSDL file, the at least one interface operation including at least one message sent during implementation of the at least one interface operation, the at least one message using the at least one data type; and
  generate a business object based on the WSDL file, the business object including the at least one data type and the at least one interface operation, the business object configured to expose the web service functionality in an integrated manner within a business object based application environment, the generating including:
    converting the at least one data type to a format consistent with the business object based application environment,
    creating at least one business object node of the business object that corresponds to each interface operation of the WSDL file, the at least one business object node being based on the at least one message, and
    creating a node action for the at least one business object node, the node action corresponding to the at least one interface operation.

18. The computer program product of claim 17 wherein an input message of the at least one interface operation is mapped to an action parameter input structure for the node action.

* * * * *